July 30, 1940.     J. F. DIETRICH ET AL      2,209,328
METHOD OF TREATING CONCENTRATED MILK PRODUCTS
Original Filed March 17, 1937
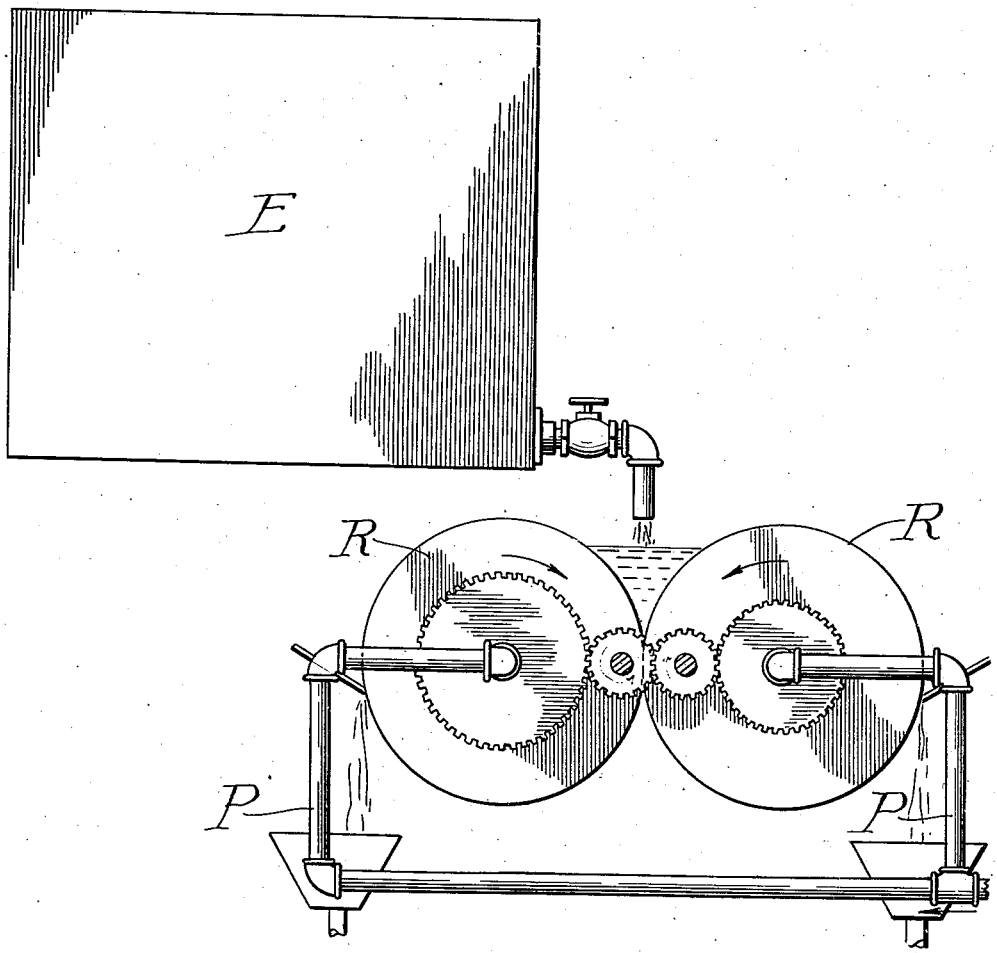
Inventors:
Julius F. Dietrich
Richard H. Dietrich
By Banning & Banning
Attorneys.

Patented July 30, 1940

2,209,328

UNITED STATES PATENT OFFICE 2,209,328

METHOD OF TREATING CONCENTRATED MILK PRODUCTS

Julius F. Dietrich and Richard H. Dietrich, Sheboygan, Wis.; said Richard H. Dietrich administrator of said Julius F. Dietrich, deceased Application March 17, 1937, Serial No. 131,454
Renewed October 21, 1939

2 Claims. (Cl. 99—200)

The method of the present invention is applied to the condensed milk after its delivery from the evaporator and while it is in a semi-fluid or viscous condition, and the object of the treatment is primarily to refine the product by subjecting it to an abrasive pressure applied between rolls or the like moving at different speeds, which treatment has the effect of preventing the formation of lactose crystals which if present in the completed product gives it a rough or sandy texture, which is undesirable. Heretofore various methods have been attempted to prevent the formation of lactose crystals with varying degrees of success, and in particular it has been sought to overcome this crystallizing tendency by an emulsifying treatment of the raw milk and also by the use of proper methods of cooling, but the present process is found to be superior to the methods above referred to, in that it not only appears to result in a more perfect emulsification but also cools and refines the product at the same time, so that the product attains a smooth and velvety condition, which makes it easier to handle and improves its quality and its adaptability for use in the making of confections or other edible products.

By ordinary processes, when milk is dehydrated to a point which brings the moisture content at or below approximately 35%, the lactose or milk sugar has a tendency to crystallize or form very small rubberlike particles which in the completed product give a rough or grainy texture, and as the product gets older, this tendency is aggravated. If it be attempted to overcome this crystallizing tendency by the application of high heat to the raw or finished product, this has the effect of coagulating the albumen and of retarding the crystallization, but the application of high heat is objectionable for various reasons.

The method of the present invention obtains the desired result without developing other objectionable complications and results in the formation of a more perfect product than can be obtained by any of the earlier methods above referred to.

The drawing is a diagram showing mechanism adapted to carry out the method of the present invention.

For the purpose of exemplifying the method of the present invention, it may be assumed that it is applied to a sweetened condensed milk product, which comprises approximately 42% sugar, 8% butter fat, 25% milk solids, and 25% water. Such a product leaves the evaporator in a heated condition, and must be cooled mechanically, and during the mechanical cooling the product develops the tendency to crystallize, which it is the object of the present invention to overcome or counteract. According to the present method, the condensed product, upon leaving the evaporator E, is fed in the form of a thin film between the closely adjacent surface of two or more rolls R, or sets of rolls, having a compressive relation to one another, so that, as the product is passed in the form of a film through the bite of the rolls, it is not only subjected to a heavy compression but to the rubbing or abrasive action resulting from the variation in the feeding speed of the roller surfaces, which practically reduces the particles of the product to a colloidal condition of fineness, so that a refining effect occurs due to the compressive and abrasive action, and at the same time the passing film of the product is cooled by contact with the roller surfaces which are maintained in a cold condition by water circulation or the like through the rolls supplied through pipes P or the like.

The roller treatment has a tendency to increase the viscosity of the product or to thicken it and also to "shorten" it so that it is not gummy or stringy, and also to prevent the release of the lactose in the form of crystals or crystallike bodies, which if released would give a granular or sandy texture to the product. In fact, passing the product through the rolls and subjecting it to the compressive and abrasive effect above referred to, has the tendency to instantly and perfectly emulsify and cool and refine the product, so that further physical and chemical changes can not take place, and the product thereafter will remain free from a tendency toward crystallization or other deleterious reaction.

Also it will be understood that the term "milk product" is intended to cover various mixtures which employ condensed or partially dried milk as an essential constituent, with the addition, if desired, of sugar or flavoring extracts or materials commonly employed in the making up of an ice cream mix or similar mixture of ingredients. The presence of such added ingredients in no material way affects the principal result sought, which is to subject the product to a roller action or similar compressive abrasive action, which so modifies the physical condition of the product as to prevent the release of the lactose (milk sugar) and the formation of crystals or similar granular particles in the completed product.

Although the employment of unequally driven rollers to produce the compressive abrasive action referred to provides a convenient mechanism for securing the desired degree of fineness or comminution in the milk particles, it will be understood that other means may be employed which are capable of producing a like physical effect, as for instance mechanisms of the character commonly employed in the reduction of particles to a colloidal condition of fineness, so that the present method is in no way limited to the employment of any particular mechanism for obtaining the results above described.

We claim:

1. The method of refining a condensed milk product containing not to exceed thirty-five percent moisture which consists in subjecting a film of the product while in a heated condition to compressive abrasive action between closely adjacent relatively cold surfaces to simultaneously cool the product to increase its viscosity and refine it to the extent necessary to prevent the release of lactose in the form of crystalline bodies within the completed product.

2. The method of refining a condensed milk product containing not to exceed thirty-five percent moisture which consists in subjecting a film of said product while in a relatively heated condition to the compressive abrasive action of relatively cold closely adjacent roller surfaces to simultaneously cool and refine the product by preventing the release of lactose in the form of crystalline bodies in the completed product.

RICHARD H. DIETRICH.
JULIUS F. DIETRICH.